United States Patent
Yamashita et al.

(12) 
(10) Patent No.: US 6,708,388 B1
(45) Date of Patent: Mar. 23, 2004

(54) METHOD OF MAKING A PERMANENT MAGNET FIELD-TYPE COMPACT DC MOTOR

(75) Inventors: Fumitoshi Yamashita, Ikoma (JP); Shinji Toda, Yonago (JP); Eiji Uenishi, Yonago (JP); Yuichiro Sasaki, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 49 days.

(21) Appl. No.: 10/088,171

(22) PCT Filed: Sep. 14, 2000

(86) PCT No.: PCT/JP00/06298

§ 371 (c)(1), (2), (4) Date: Jul. 10, 2002

(87) PCT Pub. No.: WO01/20754

PCT Pub. Date: Mar. 22, 2001

(30) Foreign Application Priority Data

Sep. 16, 1999 (JP) .............................. 11-262143

(51) Int. Cl.[7] .............................................. H02K 15/16
(52) U.S. Cl. .......................... 29/596; 29/607; 148/101; 148/112; 148/301; 310/154.21; 310/154.26; 310/154.29
(58) Field of Search .................. 29/596, 607, 608, 29/604; 310/154.21–154.23, 154.26, 154.28, 154.29, 154.31, 154.32; 148/101, 105, 112, 24, 306, 301–302

(56) References Cited

U.S. PATENT DOCUMENTS

| 4,710,239 A | 12/1987 | Lee et al. ..................... 148/101 |
| 4,913,745 A | * 4/1990 | Sato ............................ 148/103 |
| 5,204,569 A | 4/1993 | Hino et al. .................. 310/154 |

FOREIGN PATENT DOCUMENTS

| EP | 0 284 033 | 9/1988 |
| JP | 6-236807 | 8/1994 |
| JP | 411918390 A | * 7/1998 |
| JP | 410201206 A | * 1/1999 |
| JP | 11-98799 | 4/1999 |

* cited by examiner

*Primary Examiner*—Peter Vo
*Assistant Examiner*—Donghai Nguyen
(74) *Attorney, Agent, or Firm*—Wenderoth, Lind & Ponack, L.L.P.

(57) ABSTRACT

A permanent magnet field-type compact DC motor having a high output and a low cogging torque is made by fixing a pair of rare earth magnets mainly composed of rare earth-iron-based rapidly quenched and solidified flakes to a soft magnetic frame so as to extend along an inner peripheral surface thereof, and by unsaturation-magnetizing the rare earth magnets so that demagnetization curves at circumferentially opposite end portions of the rare earth magnets are made smaller than a demagnetization curve at a central portion of a magnetic pole of each of the rare earth magnets.

12 Claims, 5 Drawing Sheets

METHOD OF MAKING A PERMANENT MAGNET FIELD-TYPE COMPACT DC MOTOR

BACKGROUND OF THE INVENTION

1. Technical Field

The present invention generally relates to a compact DC (direct-current) motor suited for use in audio-visual appliances such, for example, as optical pickups for MDs or CD-ROMs and, in particular but not exclusively, to a permanent magnet field-type compact DC motor utilizing arcuate permanent magnets prepared from rare earth metal, having a low cogging torque, capable of providing a high output and capable of precisely rotating with minimized starting voltage and current. The present invention also relates to a method of making the permanent magnet field-type compact DC motor.

2. Description of Related Art

FIGS. 1A and 1B depict a permanent magnet field-type compact DC motor and an arcuate permanent magnet used therein, respectively, to which the present invention is applicable. In these figures, reference numeral 1 represents a pair of arcuate permanent magnets; reference numeral 2 represents a soft magnetic frame; reference numeral 3 represents an armature including a brush-commutator, an armature shaft and a bearing; and reference numeral 4 represents generally U-shaped springs used to urge and fixedly retain the respective arcuate permanent magnets 1 against the soft magnetic frame 2. Even this permanent magnet field-type compact DC motor is, as is the case with any other permanent magnet motor, required to have a compact size, a high output and a highly precise rotational performance.

However, it has been recognized that the permanent magnet field-type compact DC motor has a problem in that the use of a reduced diameter of the armature 3 renders it difficult to reduce the size of the motor without the output performance being sacrificed. Specifically, it is well known that ferrite magnets generally have a relatively low maximum energy product [BH]max regardless of the compression, injection or extrusion molding process using a sintering technique or a resinous material as a binder. Therefore, reduction in size of the ferrite magnets used in the permanent magnet field-type compact DC motor would result in that no sufficient static magnetic field is developed in a space between the permanent magnets 1 and the armature 3, thus considerably reducing the motor output. In view of this, arcuate rare earth magnets having a so-called high maximum energy product [BH]max have long been desired for, because they can provide a strong static magnetic field in the space between the permanent magnets 1 and the armature 3 even though the motor is reduced in size.

When it comes to the arcuate rare earth magnets of a maximum usable thickness smaller than 1 mm, which are effective to reduce the size of the permanent magnet field-type compact DC motor, the method of making such arcuate rare earth magnets is currently limited. By way of example, Japanese Laid-open Patent Publication (unexamined) No. 6-236807 discloses a method of making an arcuate rare earth magnet by the use of an extrusion molding technique. According to this known method, a molten fluidized material including various rare earth magnetic powder having a characteristic ranging from a magnetically anisotropy to a magnetically isotropy in admixture with a thermoplastic resin is poured into a mold assembly and is, after having been cooled within the mold assembly down to a temperature lower than the melting point of the thermoplastic resin, extruded to form an arcuate rare earth magnet. The resultant arcuate rare earth magnet is described as having a maximum thickness of 0.9 mm±30 µm.

On the other hand, the permanent magnet field-type compact DC motor utilizing the arcuate rare earth magnets of the kind described above and capable of providing a strong static magnetic field in the space between the rare earth magnets and the armature 3 as compared with the ferrite magnets has an additional problem associated with increase of the cogging torque. Because of the presence of armature iron core teeth 31 and slots 32 on an outer peripheral surface of the armature 3 facing the permanent magnets 1, the cogging torque results from generation of torque pulsation brought about by change in permeance incident to rotation of the armature 3. The cogging torque is detrimental to the permanent magnet field-type compact DC motor that is required to have a reduced size, a high output and a highly accurate rotational performance for which the present invention is intended.

Regardless of whether or not the permanent magnets used are in the form of rare earth magnets, means for reducing the cogging torque defined by the shape of the arcuate magnets employed in the permanent magnet field-type compact DC motor is implemented by causing inner and outer radii of curvature of the arcuate magnets to be eccentric or by chamfering edges of circumferentially spaced, opposite end faces of the arcuate magnets to render them to have an inequality wall thickness so that the permeance of the magnets, in which a uniform material is uniformly magnetized from the center of a magnetic pole to any of opposite ends of each magnet, can change so as to render the distribution of void magnetic flux densities to represent a generally sinusoidal shape. (See, for example, Shogo Tanaka, "Kogata Mohta-niokeru Eikyuujishaku no Ouyou (Application of Permanent Magnets in Compact Motors)", transaction of Kogata Mohta Gijutsu Symposium, pp. 7, 1983.)

On the other hand, U.S. Pat. No. 4,710,239 discloses a method of making an arcuate magnet. According to this disclosure, as the starting material, there is used rare earth-iron-based rapidly quenched and solidified amorphous flakes of a composition comprising, on an atomic basis, 10 to 50% of rare earth element Re (Nd and/or Pr), 1 to 10% of B, the balance being transition metal element TM, at least 60% of the transition metal element being Fe. This starting material is compacted at a temperature higher than the crystallizing temperature (about 600° C.) of a magnet phase $RE_2TM_{14}B$, but lower than 750° C. to form an isotropic fully dense magnet having a different thickness, followed by hot plasticizing process at similar temperature to provide the arcuate magnet. Since depending on the extent to which the hot plasticization is effected, easy axes of magnetization are oriented in a direction perpendicular to the direction of plastic flow, $RE_2TM_{14}B$ can be transformed into an anisotropic rare earth magnet having a strong magnetism in a relatively thick portion thereof. Thus, the above mentioned USP discloses the arcuate magnet having portions exhibiting a strong anisotropy and an isotropy, respectively.

If the arcuate rare earth magnets each having the portions of different magnetic performances are used in the permanent magnet field-type DC motor, it is possible to vary a demagnetization curve in a circumferential direction from the center of the magnetic pole and, therefore, it is also possible to render the distribution of the void magnetic flux densities between the field magnets and the armature iron core to vary smoothly to reduce the cogging torque.

As discussed above, the use in the permanent magnet field-type DC motor may be made of the arcuate rare earth magnets each having the inner and outer radii of curvature that offset relative to each other so as to render them to have a varying wall thickness, or of the arcuate magnets with their circumferential edges chamfered to have a varying wall thickness, so that the permeance of the magnets can change from the center of the magnetic pole towards the circumferentially opposite ends and, also, the magnetism of the magnets can be varied in a circumferential direction from the center of the magnetic pole, to control the pattern of distribution of the void magnetic flux densities between the field magnets and the armature iron core so as to allow the cogging torque to reduce due to the different demagnetization curves.

However, the arcuate rare earth magnets of a thickness-smaller than 1 mm suited for use in the permanent magnet field-type compact DC motor to which the present invention is applicable, each of which magnets is prepared by hot working the fully dense magnet having a different thickness with the use of the starting material in the form of the rare earth-iron-based rapidly quenched and solidified amorphous flakes and has portions of the different magnetic performances, are extremely difficult to manufacture on an industrial scale. Also, if the anisotropy is strengthened, the temperature dependent coefficient of the intrinsic coercive force tends to be reduced. For these reasons, a problem tends to arise that thermal demagnetization at the center of the magnetic pole having the strengthened anisotropy is substantially considerable, accompanied by considerable reduction in torque as a result of the thermal demagnetization of the permanent magnet field-type DC motor.

According to the method disclosed in the previously discussed Japanese publication, a material containing, for example, 95 wt % of magnetically isotropic, rare earth-iron-based rapidly quenched and solidified flakes and a thermoplastic resin including Nylon-12 as a principal component is used to produce by the use of an extrusion molding technique the thin-walled arcuate rare earth magnet having a maximum thickness of 0.9 mm±30 $\mu$m. However, the extrusion molding requires the thermoplastic resin when in a molten state to serve as a carrier for the rare earth-iron-based rapidly quenched and solidified flakes.

Accordingly, as compared with the rare earth magnet formed by compacting the rare earth-iron-based rapidly quenched and solidified flakes mixed with generally 3 or smaller wt % of a thermosetting resin, the amount of such flakes to be filled must be reduced, accompanied by corresponding reduction of [BH]max, thus reducing the static magnetic field in the gaps between the field magnets 1 and the armature 3. Although it may be contemplated to make the arcuate magnet having a high [BH]max by the use of a magnetically anisotropic magnetic powder, the prime problem which the present invention is intended to solve lies in the difficulty involved in the compacting technique in making the thin-walled arcuate magnet of a maximum thickness smaller than 1 mm within a tolerance of ±30 $\mu$m due to variation in scale during the molding (see Japanese Laid-open Patent Publication No. 6-236807 referred to above). It is, however, pointed out that even though this problem is successfully solved, the resultant arcuate magnet formed by the compacting technique is mechanically fragile to an extent the amount of the resin is reduced.

Accordingly, the arcuate rare earth magnet formed by the use of the compacting technique cannot be deflected to snugly fit to a corresponding portion of the soft magnetic frame when it is to be fixedly positioned such as described in Japanese Laid-open Patent Publications (unexamined) No. 10-201206 and No. 11-18390. In other words, the secondary problem to be solved by the present invention lies in means for mounting the arcuate rare earth magnets, formed by the use of the compacting technique, to the soft magnetic frame in a manner consistent with the mechanical nature of those magnets. Also, since as compared with the arcuate rare earth magnets formed by the use of the extrusion molding technique, the arcuate rare earth magnets tend to have a high [BH]max, the third problem to be solved by the present invention is to provide a method of making the permanent magnet field-type compact DC motor of a kind wherein, along with the cogging torque reducing means brought about by the well known shape of the magnets, the arcuate rare earth magnets molded from the rare earth-iron-based rapidly quenched and solidified flakes of a magnetically isotropic nature into an arcuate shape are unsaturation-magnetized to exhibit different demagnetization curves at the center of the magnetic pole and at the circumferentially opposite ends thereof to thereby reduce the cogging torque.

The present invention is intended to provide a permanent magnet field-type compact DC motor capable of providing a stronger static magnetic field in spaces between an armature and field magnets than the ferrite magnets, and having a low cogging torque, a small size and a high output. The present invention is also intended to provide a method of making such a permanent magnet field-type compact DC motor. The DC motor according to the present invention is made by molding rare earth-iron-based rapidly quenched and solidified flakes of a magnetic isotropy into an arc.

SUMMARY OF THE INVENTION

In accomplishing the above and other objectives, the method of making a permanent magnet field-type compact DC motor according to the present invention comprises the steps of fixing a pair of rare earth magnets mainly composed of rare earth-iron-based rapidly quenched and solidified flakes to a soft magnetic frame so as to extend along an inner peripheral surface thereof, and unsaturation-magnetizing the rare earth magnets so that demagnetization curves at circumferentially opposite end portions of the rare earth magnets are made smaller than a demagnetization curve at a central portion of a magnetic pole of each of the rare earth magnets.

Advantageously, the soft magnetic frame has portions that do not serve as a back yoke at outer peripheral surfaces of the circumferentially opposite end portions of the rare earth magnets, and the rare earth magnets are unsaturation-magnetized with a soft magnetic material having a round or oval section interposed therebetween.

Alternatively, spaces are formed on respective sides of a magnetizing yoke and between the magnetizing yoke and an outer peripheral surface of the soft magnetic frame at locations of the circumferentially opposite end portions of the rare earth magnets, and the rare earth magnets are unsaturation-magnetized with a soft magnetic material having a round or oval section interposed therebetween. The rare earth magnets are unsaturation-magnetized by creating a greater demagnetizing field at the circumferentially opposite end portions of the rare earth magnets than at the central portion of the magnetic pole.

Again advantageously, the circumferentially opposite end portions of each of the arcuate rare earth magnets have respective generally flat surfaces forming an angle of 50° to 82° on an outer peripheral surface thereof so that the soft magnetic frame does not serve as a back yoke at the circumferentially opposite end portions of the arcuate rare earth magnets.

It is preferred that the strength of an unsaturation-magnetizing field ranges from 15 to 30 kOe.

After the pair of rare earth magnets have been unsaturation-magnetized, they are heated so that a demagnetizing factor at the circumferentially opposite end portions is made greater than that at the central portion of the magnetic pole.

The rare earth-iron-based rapidly quenched and solidified flakes are made of a magnetically isotropic $RE_2TM_{14}B$ (RE: Nd or Pr; TM: Fe or Co) phase smaller than 300 nm and have an intrinsic coercive force of 8 to 10 kOe and a remanent magnetization of 7.4 to 8.6 kG.

The rare earth-iron-based rapidly quenched and solidified flakes contain magnetically isotropic ones of a nano-composite structure having a soft magnetic phase such as $\alpha Fe$, $Fe_3B$, $Fe_2B$ or the like and a hard magnetic phase such as $RE_2TM_{14}B$.

The rare earth magnets are obtained by compression-molding the rare earth-iron-based rapidly quenched and solidified flakes with a bonding agent, and the circumferentially opposite end portions of each of the rare earth magnets are urged and fixedly retained against the soft magnetic frame by respective springs. Each of the springs is made of a soft magnetic material having a round or oval section.

Alternatively, the rare earth magnets are obtained by extrusion-molding the rare earth-iron-based rapidly quenched and solidified flakes with a bonding agent, and the circumferentially opposite end portions of each of the rare earth magnets are caused to engage with respective stoppers formed on the soft magnetic frame.

The rare earth magnets may be fully dense magnets obtained by hot compression-molding the rare earth-iron-based rapidly quenched and solidified flakes at a temperature higher than a crystallizing temperature and lower than 750° C. In this case, the rare earth-iron-based rapidly quenched and solidified flakes contain 13 to 15 atomic percent Nd and/or Pr, 5 to 10 atomic percent B, 0 to 20 atomic percent Co, and a balance of an amorphous phase containing impurities and/or an $RE_2TM_{14}M$ (RE: Nd or Pr; TM: Fe or Co) phase smaller than 300 nm.

It is preferred that the fully dense magnets be heated for directly energizing the rare earth-iron-based rapidly quenched and solidified flakes. By so doing, the outer peripheral surface of the magnetic pole other than the circumferentially opposite end portions of each of the fully dense magnets and a soft magnetic back yoke are integrated by direct energization.

The circumferentially opposite end portions of each of the fully dense magnets are urged and fixedly retained against the soft magnetic frame by respective springs.

In another aspect of the present invention, a permanent magnet field-type compact DC motor comprises a soft magnetic frame, a pair of permanent magnets fixed to an internal surface of the soft magnetic frame and each having circumferentially opposite end portions, and an armature mounted in the soft magnetic frame and interposed between the pair of permanent magnets, wherein demagnetization curves at the circumferentially opposite end portions are made smaller than a demagnetization curve at a central portion of a magnetic pole of each of the permanent magnets.

The circumferentially opposite end portions are unsaturation-magnetized. The permanent magnets are rare earth magnets mainly composed of rare earth-iron-based rapidly quenched and solidified flakes. The permanent magnets are obtained by compression molding and have a thickness smaller than 1 mm.

The permanent magnet field-type compact DC motor according to the present invention is incorporated into a disc feeder, a pickup device or the like.

As described above, the present invention makes use of the rare earth-iron-based rapidly quenched and solidified flakes, which have a nature in which both the remanent magnetic flux density Br and the coercive force Hc gradually increase simultaneously as functions of a magnetization field, and a well-balanced demagnetization curve can be obtained even in an unsaturation-magnetized state. By combining unsaturation magnetization of field magnets and a conventional cogging torque reducing means offered by a specific magnet shape, a permanent magnet field-type DC motor having a further reduced size, a high output, and a high rotating performance can be obtained.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1A:
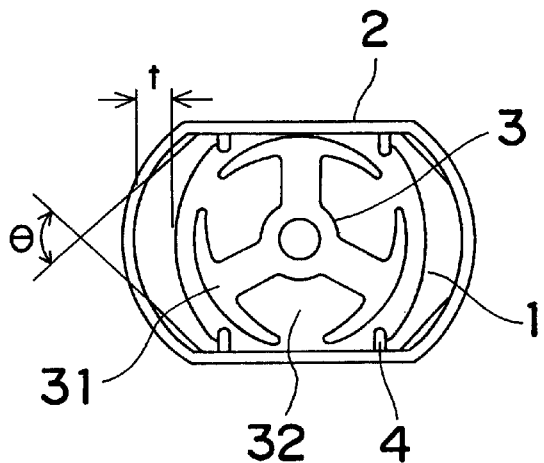
FIG. 1A is a vertical sectional view of a motor to which the present invention is applied.
Figure 1B:
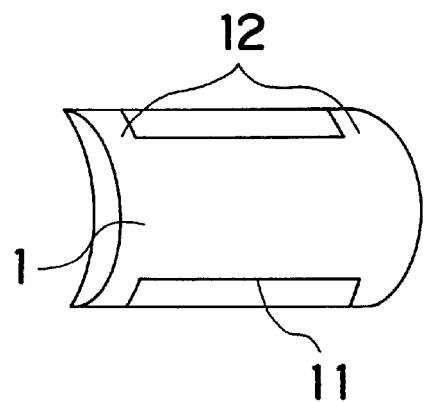
FIG. 1B is a perspective view of a magnet mounted in the motor of FIG. 1A.

This application is based on an application No. 11-262143 filed Sep. 16, 1999 in Japan, the content of which is incorporated hereinto by reference.

In a permanent magnet field-type compact DC motor according to the present invention, two arcuate rare earth magnets mainly composed of rare earth-iron-based rapidly quenched and solidified flakes are opposed to each other with an armature interposed therebetween. Each of the two arcuate rare earth magnets is fixed along the inner peripheral surface of a soft magnetic frame and is then unsaturation-magnetized under a magnetizing magnetic field of 15 to 30 kOe so that a demagnetization curve at circumferential end portions of a magnetic pole may be made smaller than a demagnetization curve at a central portion of the magnetic pole.

The term "saturation magnetization" is generally defined as imparting a maximum magnetic force to a permanent magnet material, while the term "unsaturation magnetization" used herein is defined as not imparting a maximum magnetic force to the permanent magnet material. Once the permanent magnet material is magnetized, the magnetic force thereof is permanently retained. For this reason, the general practice is such that the permanent magnet material is caused to hold a maximum magnetic force for effective use thereof. The unsaturation magnetization means that magnetization is carried out under the condition in which there still exists room for retention of the magnetic force.

In the practice of the present invention, the arcuate rare earth magnets are fixed in the soft magnetic frame in such a manner that the outer peripheral surfaces of the former extend along the inner peripheral surface of the latter, and the soft magnetic frame is caused to have portions that do not serve as a back yoke at circumferentially opposite outer surfaces of the former. Under such condition, unsaturation magnetization is carried out with a soft magnetic material having a round or oval section interposed between the two arcuate rare earth magnets. Alternatively, the unsaturation magnetization may be carried out using a magnetizing yoke. In this case, spaces are formed on respective sides of an end of the magnetizing yoke and between the magnetizing yoke and the outer peripheral surface of the soft magnetic frame at locations outwardly of the circumferentially opposite outer surfaces of the magnets. It is preferred that the circumferentially opposite end portions of each of the magnets have respective generally flat surfaces forming an angle of 50° to 82° on an outer peripheral surface thereof so that the soft magnetic frame does not serve as a back yoke at such portions, thereby further reducing the cogging torque.

Furthermore, the cogging torque can be reduced by unsaturation-magnetizing the two opposed arcuate rare earth magnets fixed along the inner peripheral surface of the soft magnetic frame and by subsequently heating them so that the demagnetizing factor at the circumferentially opposite end portions of the magnets may be made greater than that at the central portion of a magnetic pole.

As disclosed in, for example, "Rare Earth-Iron-Boron Materials; A New Era in Permanent Magnets" (Ann. Rev. Sci. Vol-16 (1986)) written by J. F. Herbest, rare earth-iron-based rapidly quenched and solidified flakes used herein are obtained by first rapidly quenching and solidifying a molten alloy that contains Nd, Fe and B in a proportion close to 2:14:1 and by subsequently heat-treating it to deposit a magnetically isotropic $Nd_2Fe_{14}B$ phase. It is sufficient if the $Nd_2Fe_{14}B$ phase has a single domain critical size smaller than about 300 nm. Alternatively, the rare earth-iron-based rapidly quenched and solidified flakes may be nano-composite ones in which an a Fe- or $Fe_3B$-based soft magnetic phase and an $Nd_2Fe_{14}B$- or $Sm_2Fe_{17}N_3$-based hard magnetic phase are coupled together by a strong exchange bonding upon heat treatment. Such rare earth-iron-based rapidly quenched and solidified flakes are quite useful in the present invention in that they have a nature in which both the remanent magnetic flux density Br and the coercive force Hc gradually increase simultaneously as functions of a magnetization field.

Accordingly, a well-balanced demagnetization curve can be obtained even in an unsaturation-magnetized state. By way of example, in a magnetic circuit having different permeances at the central portions of the magnetic poles of the two arcuate rare earth magnets and at the circumferentially opposite end portions thereof, if magnetization is carried out with a soft magnetic material having a round or oval section interposed between the two magnets, the opposite end portions of the magnets are caused to have a demagnetization curve (the remanent magnetic flux density Br and the coercive force Hcb) smaller than that at the central portions of the magnetic poles by the action of a demagnetizing field of the soft magnetic material. By so doing, notwithstanding that the central portions of the magnetic poles and the opposite end portions of the magnets are of the same material, the magnets provide a single permanent magnet field as if it is formed with magnets having different magnetic properties.

In the practice of the present invention, the rare earth-iron-based rapidly quenched and solidified flakes are made of a magnetically isotropic $RE_2TM_{14}B$ (RE: Nd or Pr; TM: Fe or Co) phase smaller than 300 nm and have an intrinsic coercive force (Hci) of 8 to 10 kOe and a remanent magnetization of 7.4 to 8.6 kG. Alternatively, the rare earth-iron-based rapidly quenched and solidified flakes employed in the present invention contain the magnetically isotropic ones of a nano-composite structure having a soft magnetic phase such as a Fe, $Fe_3B$, $Fe_2B$ or the like and a hard magnetic phase such as $RE_2TM_{14}B$ or the like. If the rare earth-iron-based rapidly quenched and solidified flakes together with a bonding agent are compression-molded into arcuate magnets, a permanent magnet field-type compact DC motor can be made by placing two arcuate magnets in a manner that the outer peripheral surfaces thereof are opposed to and extend along the inner peripheral surface of a soft magnetic frame and by urging and fixedly retaining the circumferentially opposite end portions of the magnets with springs. In this case, even the arcuate rare earth magnets that have been configured to be mechanically fragile by the compression molding can be incorporated into the soft magnetic frame without being broken. If the rare earth-iron-based rapidly quenched and solidified flakes together with a bonding agent are extrusion-molded into arcuate magnets, the arcuate magnets tend to deflect slightly. Accordingly, a permanent magnet field-type compact DC motor can be made by placing two arcuate magnets in a manner that the outer peripheral surfaces thereof are opposed to and extend along the inner peripheral surface of a soft magnetic frame and by engaging the circumferentially opposite end portions of the magnets with protrusions formed on the soft magnetic frame.

The rare earth-iron-based rapidly quenched and solidified flakes may have an alloy composition of 13 to 15 atomic percent Nd and/or Pr, 5 to 10 atomic percent B, 0 to 20 atomic percent Co, and a balance of an amorphous phase mainly composed of impurities that are indispensable for the making of Fe and/or an $RE_2TM_{14}M$ (RE: Nd or Pr; TM: Fe or Co) phase smaller than 300 nm. In this case, if a permanent magnet field-type compact DC motor employs fully dense arcuate rare earth magnets that have been compression-molded at a temperature higher than a crystallizing temperature and lower than 750° C. so as to be magnetically isotropic or substantially magnetically isotropic by being made slightly anisotropic in the press direction, it is preferred that a direct energizing means for directly energizing the rare earth-iron-based rapidly quenched and solidified flakes be employed as a heating means for the fully dense magnets. By so doing, the outer peripheral surfaces of the magnetic poles other than the circumferentially opposite end portions of the fully dense magnets and the soft magnetic back yoke can be integrated by direct energization. Because such arcuate rare earth magnets are also mechanically fragile, it is preferred that the outer peripheral surfaces of the magnets be caused to oppose to and extend along the inner peripheral surface of the soft magnetic frame, and the circumferentially opposite end portions be urged and fixedly retained with springs.

As discussed above, the present invention makes use of the rare earth-iron-based rapidly quenched and solidified flakes, which have a nature in which both the remanent magnetic flux density Br and the coercive force Hc gradually increase simultaneously as functions of a magnetization field and with which a well-balanced demagnetization curve can be obtained even in the unsaturation-magnetized state. In the practice of the present invention, for example, a field magnet is formed by consolidating the rare earth-iron-based rapidly quenched and solidified flakes into an arc having a thickness smaller than 1 mm, and a magnetic circuit is obtained by making the permeance at the central portion of a magnetic pole and that at the circumferentially opposite end portions differ during magnetization. Furthermore, a demagnetizing field of a soft magnetic material having a round or oval section is utilized by placing it between a pair of arcuate rare earth magnets. That is, the central portion of the magnetic pole is caused to have a demagnetization curve (the remanent magnetic flux density Br and the coercive force Hcb) greater than that at the opposite end portions of the magnets by the reaction of the demagnetizing field during the magnetization of the arcuate rare earth magnets. The unsaturation magnetization with the use of the rare earth-iron-based rapidly quenched and solidified flakes has an effect of forming an integrated permanent magnet field as if it is formed with magnets having different magnetic properties, notwithstanding that the central portion of the magnetic pole and the opposite end portions of the magnets are of the same material. By combining such effect with a known cogging torque-reducing means utilizing the magnet configuration, permanent magnet field-type DC motors having a further reduced size, a high rotating accuracy, and a low cogging torque and capable of providing a high output can be made.

Such compact DC motors are preferably employed in CD or MD feeders or in optical pickup devices.

EXAMPLE 1

In this example, rare earth-iron-based arcuate magnets M1 and M2 were made using a bonding agent.

Rare earth-iron-based rapidly quenched and solidified flakes (Trade name: MQP-B) manufactured by Magnequench International In, Co. and having an alloy composition of $Nd_{12}Fe_{77}Co_5B_6$, a crystallized particle diameter of 20 to 50 nm, a magnetically isotropic $Nd_2Fe_{14}B$ phase, and a thickness of 20 to 30 μm were used. A solution of an epoxy resin in acetone (2.5 wt % in solids content) and 97.5 wt % of the rare earth-iron-based rapidly quenched and solidified flakes were first wet-mixed, and acetone was then evaporated, thereby forming a solid block at room temperature. Thereafter, the solid block was crushed and classified at room temperature into granular compounds having particle diameters smaller than 500 μm, 350 μm, 250 μm, 212 μm, and 150 μm, respectively. Each granular compound was finally added with 0.2 to 0.6 part by weight of calcium stearate powder.

Each granular compound was supplied to and weighed by a powder molding machine, in which the granular compound was compression-molded into an arcuate green compact having a thickness smaller than 1 mm under a pressure of 8 ton/cm². The arcuate green compact was then heated and hardened at a temperature of 160° C. for two minutes. In this way, thirty arcuate rare earth magnets M1 having an outer radius of 3.65 mm, an inner radius of 3.55 mm, a maximum thickness of 0.90 mm, and a length of 15.5 mm in the thrust direction were prepared for each granular compound. A variation (n=30) of the arcuate rare earth magnets with respect to the maximum thickness of 0.90 mm and an upper limit of the particle diameters of the granular compounds have the following relationship (the coefficient of correlation of the regression expression is 0.988).

$$A=0.0003P^2-0.0718P+24.745 \tag{1}$$

where A represents the thickness variation (±μm) and P represents the upper limit (μm) of the particle diameters of the granular compounds. As is clear from the regression expression, if the particle diameters of the granular compounds are smaller than 250 μm, the thickness variation of the thin-walled arcuate rare earth magnets M1 having a thickness smaller than 1 mm is below ±30 μm, and the density is 6.0 g/cm³.

On the other hand, pellets obtained by mixing 95 wt % of rare earth-iron-based rapidly quenched and solidified flakes and 5 wt % of Nylon-12 at a temperature of 260° C. were used to make arcuate rare earth magnets. Using the extrusion molding technique as disclosed in Japanese Laid-open Patent Publication No. 6-236807, arcuate rare earth magnets M2 having an outer radius of 3.65 mm, an inner radius of 3.55 mm, a maximum thickness of 0.90 mm, and a length of 15.5 mm in the thrust direction were made by setting the end temperature of a molding die at 175° C. lower than the melting point of Nylon-12. The thickness variation at the maximum thickness portion of 0.9 mm was ±30 μm, and the density was 5.7 g/cm³.

EXAMPLE 2

In this example, rare earth-iron-based arcuate magnets M3 were made without using a bonding agent.

Rare earth-iron-based rapidly quenched and solidified flakes (Trade name: MQP-C) manufactured by Magnequench International In, Co. and having an alloy composition of $Nd_{14}Fe_{65}Co_{15}B_6$, a crystallized particle diameter of 20 to 50 nm, a magnetically isotropic $Nd_2Fe_{14}B$ phase, and a thickness of 20 to 30 μm were used. These flakes were weighed and filled in a cavity of a mold assembly made up of a die and a pair of punches that also serve as respective electrodes. The flakes filled in the cavity were energized repeatedly ten times through the punches using pulse electric current having a current density of 100 A/cm² and a cycle of 0.5 second ON-0.5 second OFF, while compacting them under a pressure of 300 kgf/cm². Thereafter, the flakes were energized with DC current of 300 A/cm². Because the rate of temperature rise ΔT/Δt (° C./sec) of an object caused by the DC current is proportional to the electric resistance and the square of the current density and is inversely proportional to the specific heat and the specific gravity of the object, the rate of temperature rise is substantially determined by the value of the current density.

After about 60 seconds from the energization, the temperature of the die having a thickness of 2 mm exceeded the crystallizing temperature (about 600° C.) of the $Nd_2Fe_{14}B$ phase, and the compaction in the compressing direction was commenced due to a plastic deformation caused by the softening of the flakes. Upon completion of the compaction, when the energization was stopped (the period of time of energization: about 80 seconds), the die temperature was 710° C. After the cooling, the arcuate rare earth magnets M3 having an outer radius of 3.65 mm, an inner radius of 3.55 mm, a maximum thickness of 0.90 mm, and a length of 15.5 mm in the thrust direction were obtained by hot compression molding. When the arcuate rare earth magnets M3 were taken out, the density thereof ranged from 7.53 to 7.55 g/cm$^3$. In general, the thickness accuracy of all the fully dense magnets simply depends upon the amount to which the flakes were filled in the cavity. Furthermore, unlike in the magnets containing a bonding agent, the magnets made in this example were subjected to no spring back when they were released from the mold assembly and, hence, the mold shape including the outer radius, the inner radius and the like was transferred just as it was.

The allowable stress of the arcuate rare earth magnets M1, M2, M3 having an outer radius of 3.65 mm, an inner radius of 3.55 mm, a maximum thickness of 0.90 mm, and a length of 15.5 mm in the thrust direction, and a method of fixing them to the soft magnetic frame are discussed hereinafter.

Figure 2:
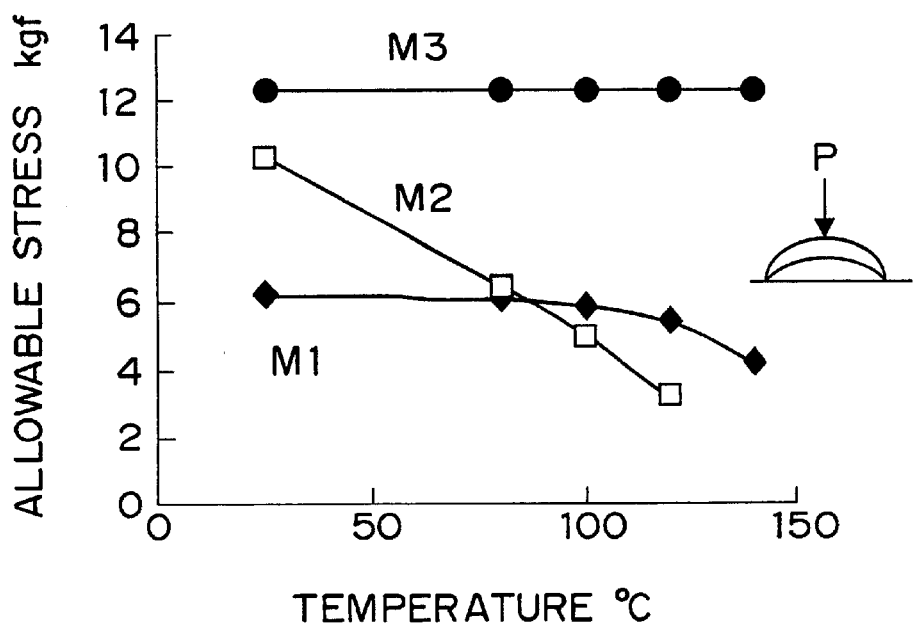
FIG. 2 is a graph showing the temperature dependency of the allowable stress of arcuate rare earth magnets.

FIG. 2 depicts a graph showing the temperature dependency of the allowable stress of the arcuate rare earth magnets M1, M2, M3. As shown therein, the allowable stress is a stress (kgf) when the magnets M1, M2, M3 were damaged by pressing the maximum thickness portions of the magnets. In the figure, M1 represents the arcuate rare earth magnets obtained by compression molding, M2 represents those obtained by extrusion molding, and M3 represents those obtained by hot compression molding.

It can be seen from FIG. 2 that the allowable stress of M1 is lower than 60% of that of M2 at room temperature. Furthermore, the magnets M1 cannot be deflected and are fragile. Accordingly, if the magnets M1 are caused to engage with and snugly fit to a corresponding portion of the soft magnetic frame in a manner as described in Japanese Laid-open Patent Publications Nos. 10-201206 and 11-18390, cracking or fracture is caused. For this reason, the magnets M1 cannot be incorporated into the soft magnetic frame with the yield maintained high on an industrial scale. Although the bonding of the magnets M1 to the soft magnetic frame is possible, incorporation of the magnets M1 into the soft magnetic frame by such bonding is not desirable in the permanent magnet field-type compact DC motors, as described in Japanese Laid-open Patent Publications Nos. 10-201206 and 11-18390.

Also, FIG. 2 reveals that the allowable stress of M1 exceeds 6 kgf at room temperature. As compared with M2, the allowable stress of M1 is substantially constant in a temperature region below a high temperature of about 120° C. Accordingly, as shown in FIG. 1A, it is desirable that a pair of magnets M1 extending along the internal surface of the soft magnetic frame 2 be fixed to the soft magnetic frame 3 by urging and retaining circumferentially opposite end portions of the magnets M1 with the use of, for example, the generally U-shaped springs 4. The strength of retention of the magnets M1 to the soft magnetic frame depends upon the elastic force of the springs 4. In general, under actual use conditions of the permanent magnet field-type compact DC motors, the urging force required for retaining the magnets M1 is smaller than 0.5 kgf. Accordingly, as can be seen from FIG. 2 depicting the temperature dependency of the allowable stress, the safety factor of the allowable stress exceeds 10 in the actual use temperature region up to a maximum temperature of 120° C. This safety factor guarantees sufficient reliability in retaining the magnets M1 on the soft magnetic frame 2.

On the other hand, because the magnets M2 tend to deflect a little, they can be retained on the soft magnetic frame 2 by first deflecting and inserting them into the soft magnetic frame 2 and by subsequently engaging circumferentially opposite edges thereof with respective stoppers such, for example, as protrusions formed on corresponding portions of the soft magnetic frame 2. Although the magnets m3 have a high allowable stress, they are mechanically fragile, like the magnets M1. Accordingly, it is preferred that the magnets M3 be fixed to the soft magnetic frame 2 in the same manner as the magnets M1.

A method of unsaturation-magnetizing the arcuate rare earth magnets M1 having an outer radius of 3.65 mm, an inner radius of 3.55 mm, a maximum thickness of 0.90 mm, and a length of 15.5 mm in the thrust direction, and the characteristics of the permanent magnet field-type compact DC motors are discussed hereinafter.

(1) Intrinsic coercive force and magnetizing properties

Figure 3:
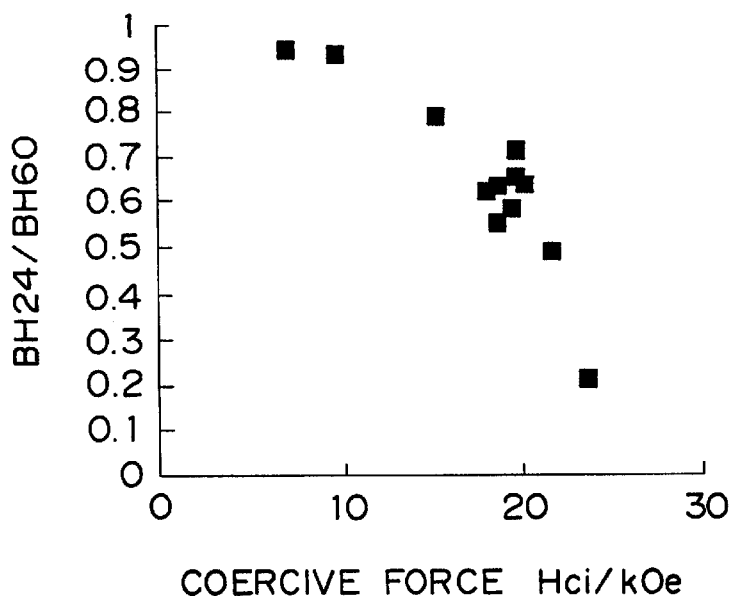
FIG. 3 is a graph showing a relationship between the intrinsic coercive force and the magnetization properties of the magnets.

FIG. 3 depicts a relationship between the intrinsic coercive force Hci and the magnetization properties of the magnets M1 obtained by compression-molding the rare earth-iron-based rapidly quenched and solidified flakes having an alloy composition of $Nd_x[Fe_{0.8}Co_{0.2}]_{1-x}B_6$ together with a bonding agent so as to have a density of 6 g/cm$^3$. The magnetization properties are expressed by a ratio of [BH] max of $\phi 5$ mm-magnets (L/D=1) when the magnets were pulse-magnetized in a magnetizing field Hm of 24 kOe or 60 kOe.

As shown in FIG. 3, Even if the intrinsic coercive force Hci of the magnetically isotropic flakes is 8 kOe, a magnetizing field Hm of only about 24 kOe provides unsaturation magnetization. If the intrinsic coercive force Hci exceeds 10 kOe, the magnetization properties decrease considerably. In the practice of the present invention, it is preferred that the magnetization properties be greater than 90% of a full magnetization at a central portion of a magnetic pole. To this end, the intrinsic coercive force Hci of the rare earth-iron-based rapidly quenched and solidified flakes should be smaller than 10 kOe.

Because the magnets M3 prepared by hot compression molding are subject to plastic deformation at temperatures over a crystallizing temperature of the $Nd_2Fe_{14}B$ phase, the amount of rare earth elements (Nd/Pr) should be greater than 13 atomic percent, which is slightly greater than the stoichiometric composition of $Nd_2Fe_{14}B$. It is, therefore, difficult for the intrinsic coercive force Hci to be smaller than 10 kOe in a single domain critical size of the $Nd_2Fe_{14}B$ phase to maintain thermostability If the rare earth-iron-based rapidly quenched and solidified flakes, with which an intrinsic coercive force Hci of 8 to 10 kOe can be obtained in the single domain critical size of the $Nd_2Fe_{14}B$ phase to maintain the thermostability, has an alloy composition dose to the stoichiometric composition of $Nd_2Fe_{14}B$, it is necessary to render the amount of rare earth elements (Nd/Pr) to be smaller than 12 atomic percent. The bonding of such flakes requires a bonding agent such as a resin and, from the viewpoint of the magnetization properties, it is desirable that the flakes be compression- or extrusion-molded together with the bonding agent into the arcuate rare earth magnets M1, M2 of a predetermined shape. Furthermore, the density of the rare earth-iron-based rapidly quenched and solidified flakes can be made higher by compression molding than by extrusion molding. For this reason, in order to obtain stronger static magnetic fields in the spaces between the field magnets and the armature, the use of the arcuate rare earth magnets M1 obtained by compression-molding the rare earth-iron-based rapidly quenched and solidified flakes having an intrinsic coercive force Hci of 8 to 10 kOe with a bonding agent is desirable for the permanent magnet field-type compact DC motors according to the present invention.

Figure 4:
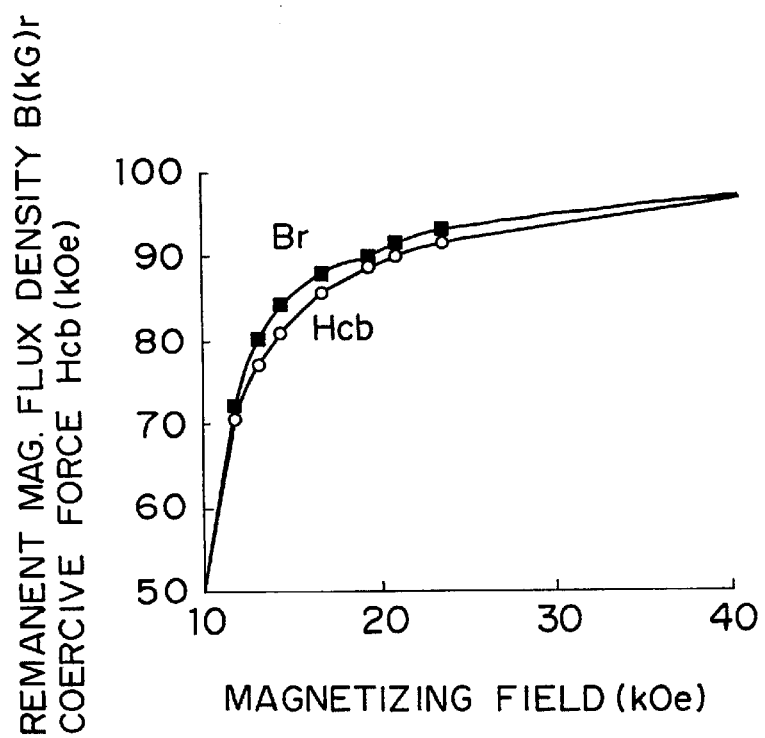
FIG. 4 is a graph showing a relationship between the remanent magnetic flux density and the coercive force of the magnets as functions of a magnetizing field.

(2) Remanent magnetic flux density and coercive force as functions of the magnetizing field FIG. 4 depicts the magnetizing field Hm-dependency of the remanent magnetic flux density Br and the coercive force Hcb (coercive force in a B-H curve) of the magnets in which the rare earth-iron-based rapidly quenched and solidified flakes were compacted. A magnetizing field Hm of 50 kOe is standardized as being 100%. In general, in the range of 10 to 40 kOe that is used to magnetize the field magnets in the permanent magnet field-type compact DC motors, the remanent magnetic flux density Br and the coercive force Hcb of the rare earth-iron-based rapidly quenched and solidified flakes of a magnetically isotropic nature as the functions of the magnetizing field increase gradually regardless of the intrinsic coercive force Hci. Accordingly, well-balanced demagnetization curves can be obtained even in an unsaturation-magnetized state. On the other hand, the ferrite magnets that have been generally used in the conventional permanent magnet field-type compact DC motors have a nature of being rapidly magnetized even in a low magnetizing field Hm and, hence, well-balanced demagnetization curves cannot be obtained in the unsaturation-magnetized state.

(3) Unsaturation magnetization of field magnets by demagnetizing field

Figure 5A:
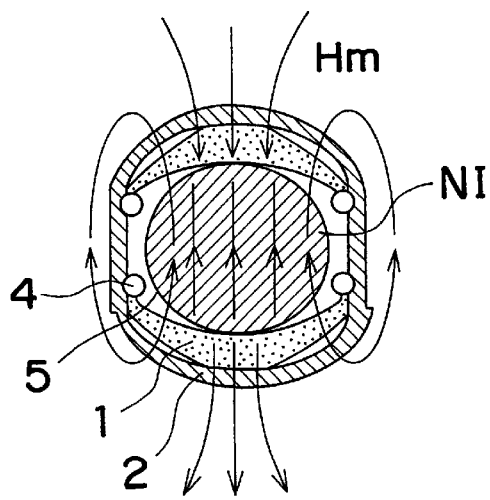
FIG. 5A is a vertical sectional view of a motor, particularly depicting a manner in which field magnets incorporated into a soft magnetic frame are being unsaturation-magnetized by making use of a demagnetizing field.
Figure 5B:
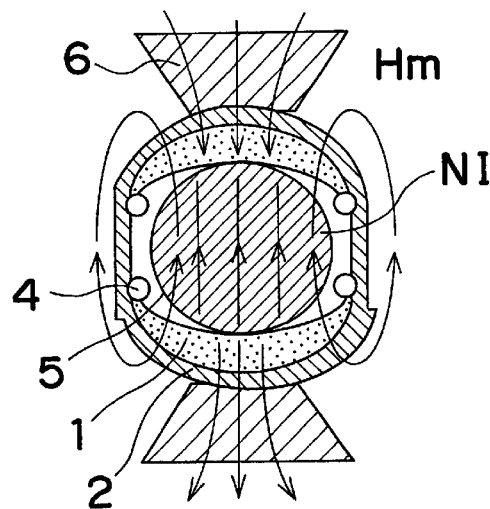
FIG. 5B is a view similar to FIG. 5A, but depicting another manner in which the field magnets incorporated into the soft magnetic frame are being unsaturation-magnetized by making use of the demagnetizing field.
Figure 5C:
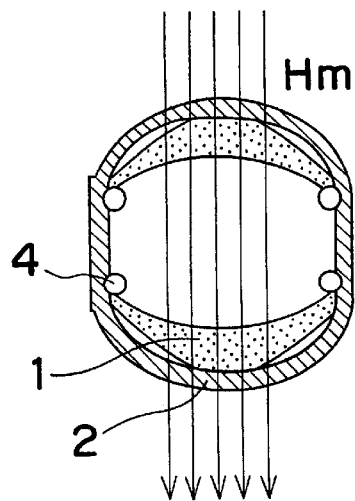
FIG. 5C is a view similar to FIG. 5A, but depicting a manner in which ordinary magnetization is being carried out.

FIGS. 5A and 5B depict the manner in which field magnets incorporated into a soft magnetic frame are being unsaturation-magnetized by making use of a demagnetizing field, while FIG. 5C depicts the manner in which ordinary magnetization is being carried out. In these figures, reference numeral 1 represent a pair of arcuate rare earth magnets; reference numeral 2 represents a soft magnetic frame in which the arcuate rare earth magnets 1 are mounted; reference numeral 4 represents generally U-shaped springs used to urge and fixedly retain the respective arcuate rare earth magnets 1 against the soft magnetic frame 2; reference numeral 5 represents a pure iron (soft magnetic material) having a round or oval section; and reference numeral 6 represent a pair of magnetizing yokes.

In the construction shown in FIG. 5A, the arcuate rare earth magnets 1 are fixed to the soft magnetic frame 2 with the pure iron 5 interposed between the arcuate rare earth magnets 1. The outer peripheral surfaces of the arcuate rare earth magnets 1 extend along the inner peripheral surface of the soft magnetic frame 2, and the soft magnetic frame 2 is caused to have portions that do not serve as a back yoke at circumferentially opposite outer surfaces of the arcuate rare earth magnets 1.

On the other hand, in the construction shown in FIG. 5B, the arcuate rare earth magnets 1 are fixed to the soft magnetic frame 2 with the pure iron 5 interposed between the arcuate rare earth magnets 1. The outer peripheral surfaces of the arcuate rare earth magnets 1 extend along the inner peripheral surface of the soft magnetic frame 2. The outer peripheral surface of the soft magnetic frame 2 is held in contact with an end face of each magnetizing yoke 6 at the circumferentially central portion of the corresponding arcuate rare earth magnet 1, and spaces are formed on respective sides of each magnetizing yoke 6 and between inclined side surfaces of the magnetizing yoke 6 and the outer peripheral surface of the soft magnetic frame 2.

In the construction of FIG. 5A or 5B, when the magnetizing field Hm is at work, the pure iron 5 having a round or oval section is magnetized, and a uniform demagnetizing field NI is simultaneously created in the pure iron 5. The lines of magnetic force emerge from a surface pole and do not produce eddies, unlike the lines of magnetic flux. At the circumferentially opposite end portions of the arcuate rare earth magnets 1, the demagnetizing field NI reacts against the magnetizing field Hm. If the generally U-shaped springs 4 are made of a soft magnetic material having a round or oval section, they create respective similar demagnetizing fields with respect to the circumferentially opposite end portions of the arcuate rare earth magnets 1. Accordingly, individual rare earth-iron-based rapidly quenched and solidified flakes of a magnetically isotropic nature constituting the arcuate rare earth magnets 1 are magnetized under the influence of both the magnetizing field Hm and the demagnetizing field NI. Such magnetization is effective in making the permanent magnet field-type compact DC motors according to the present invention and is quite different from the magnetization caused by a uniform magnetizing field Hm as shown in FIG. 5C, even if the level of Hm is the same.

(4) Reduction in cogging torque caused by demagnetizing field

Arcuate rare earth magnets M1 having an outer radius of 3.65 mm, an inner radius of 3.55 mm, a maximum thickness of 0.90 mm, and a length of 15.5 mm in the thrust direction were made by compression-molding the rare earth-iron-based rapidly quenched and solidified flakes, by inserting them into a soft magnetic frame, and by magnetizing them in a magnetizing field Hm of 15 to 30 kOe, as shown in FIG. 5A or 5B. An armature 3 was then incorporated into the soft magnetic frame to make a permanent magnet field-type compact DC motor. The induced voltage and the cogging torque of a plurality of motors thus made were measured.

Figure 6:
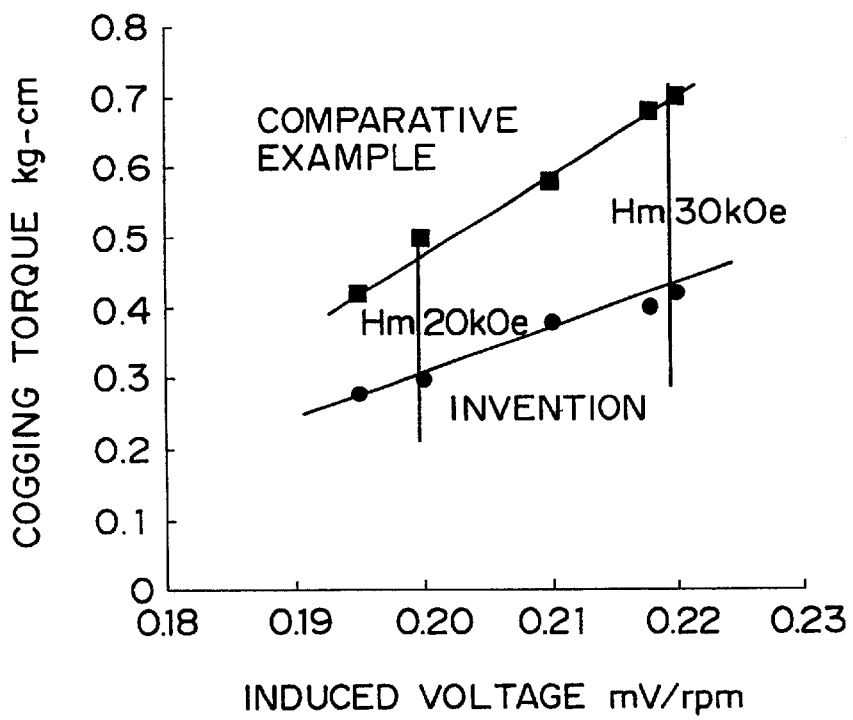
FIG. 6 is a graph showing a reduction in cogging torque caused by the demagnetizing field.

FIG. 6 depicts a relationship between the induced voltage and the cogging torque. In the figure, "Invention" means motors having field magnets magnetized in a manner shown in FIG. 5A, while "Comparative example" means motors having field magnets magnetized in a manner shown in FIG. 5C. In the motors according to the present invention, the field magnets incorporated into a soft magnetic frame were unsaturation-magnetized by making use of the demagnetizing field.

It can be seen from FIG. 6 that even if the induced voltage level is the same, the cogging torque is reduced no less than 40% in the motors according to the present invention.

After the motors were dismantled and the arcuate rare earth magnets 1 were taken out therefrom, the intrinsic coercive force Hci of fragments cut off from the central portion of magnetic pole and from the circumferentially opposite end portions of the magnets 1 was measured using a VSM. The measurements reveal that there is no great difference among the locations in the magnets of "Comparative example" magnetized as shown in FIG. 5C and the intrinsic coercive force Hci ranges from 7.9 to 8.2 kOe, and that the intrinsic coercive force Hci at the central portion of the magnetic pole of the magnets of "Invention" magnetized as shown in FIG. 5A falls within the same range (7.9 to 8.2 kOe) as that of the magnets of "Comparative example". However, the measurements also reveal that the intrinsic coercive force Hci at the circumferentially opposite end portions of the magnets of "Invention" differs from that at the center of the magnetic pole and ranges from 7.0 to 7.5 kOe. This means that the arcuate rare earth magnets according to the present invention have different demagnetization curves (B-H curves) at the center of the magnetic pole and at the circumferentially opposite end portions of the magnets, though they are of an identical uniform material. Accordingly, even if the magnet shape is the same, the cogging torque can be reduced with the use of the field magnets having demagnetization curves that decrease from the center of the magnetic pole towards the circumferentially opposite end portions.

Figure 7:
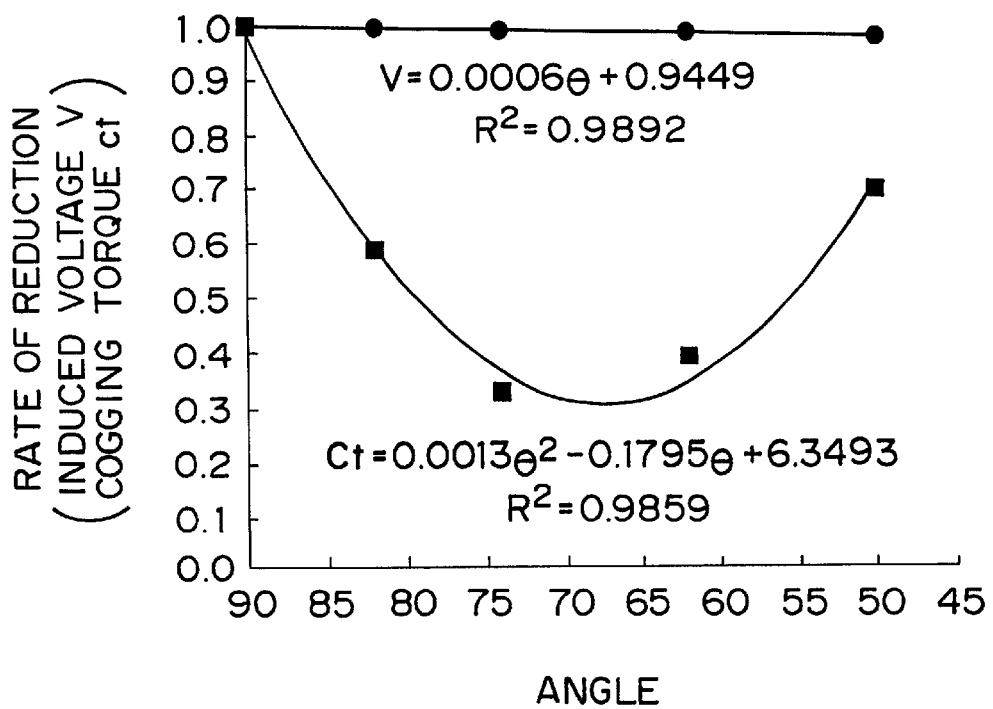
FIG. 7 is a graph showing a reduction in cogging torque caused by the demagnetizing field and the magnet shape.

(5) Reduction in cogging torque caused by a combination of demagnetizing field and magnet shape FIG. 7 depicts a relationship between an angle θ shown in FIG. 1A and the rate of reduction in cogging torque or induced voltage. The angle θ is an angle formed by two generally flat surfaces formed on the outer peripheral surface of circumferentially opposite end portions of each arcuate rare earth magnet. The length of each generally flat surface in the thrust direction was 12.5 mm. Because of the presence of the two generally flat surfaces, two spaces were formed between them and the inner peripheral surface of the soft magnetic frame and, hence, there were no back yokes at such portions. Each magnet had an outer radius of 3.65 mm, an inner radius of 3.55 mm, a maximum thickness of 0.90 mm, and a length of 15.5 mm in the thrust direction. The magnet was magnetized in the manner shown in FIG. 5A and under the influence of both the magnetizing field Hm and the demagnetizing field NI. In the permanent magnet field-type compact DC motors used herein, the induced voltage V at an angle θ of 90° was 0.218 mV/rpm and the cogging torque Ct was 1.15 g-cm, and standardization was carried on the basis of these values.

A regression expression given in FIG. 7 shows that the induced voltage V decreases linearly with respect to the angle θ. However, even if the angle θ decreases from 90° to 50°, the reduction in induced voltage is only 5%. On the other hand, the cogging torque Ct changes quadrically with respect to the angle θ, and the rate of change is maximized at an angle of about 65°, at which the cogging torque is reduced about 70% with respect to a criterion of 90°. In the range of 82° to 50°, the cogging torque is reduced no less than 40% with respect to the criterion of 90°.

As described previously, the rare earth-iron-based rapidly quenched and solidified magnetically isotropic flakes have a nature in which both the remanent magnetic flux density Br and the coercive force Hc gradually increase simultaneously as functions of a magnetization field, and provide well-balanced demagnetization curves even in an unsaturation-magnetized state. The above effect is caused by the use of the thin-walled arcuate rare earth magnets obtained by compacting such flakes and also by the unsaturation magnetization utilizing the demagnetizing field effect under the condition in which the soft magnetic frame does not serve as a back yoke at circumferentially opposite end portions of the magnets as if a field system is formed by magnets having greatly different magnetic performances.

(6) Reduction in cogging torque caused by a combination of demagnetizing field and thermal demagnetization In the manner shown in FIG. 5A, four-stage unsaturation magnetization was carried out on the arcuate rare earth magnets having an outer radius of 3.65 mm, an inner radius of 3.55 mm, a maximum thickness of 0.90 mm, and a length of 15.5 mm in the thrust direction at voltages of 1500 to 2400 volts using a capacitor having a capacitance of 2000 µF. The angle θ formed by the two generally flat surfaces on the outer peripheral surface of the circumferentially opposite end portions of the arcuate rare earth magnets was 62°. The length of each generally flat surface in the thrust direction was 12.5 mm. The magnets were subjected to thermal demagnetization at a temperature of 140° C. for five minutes.

Figure 8:
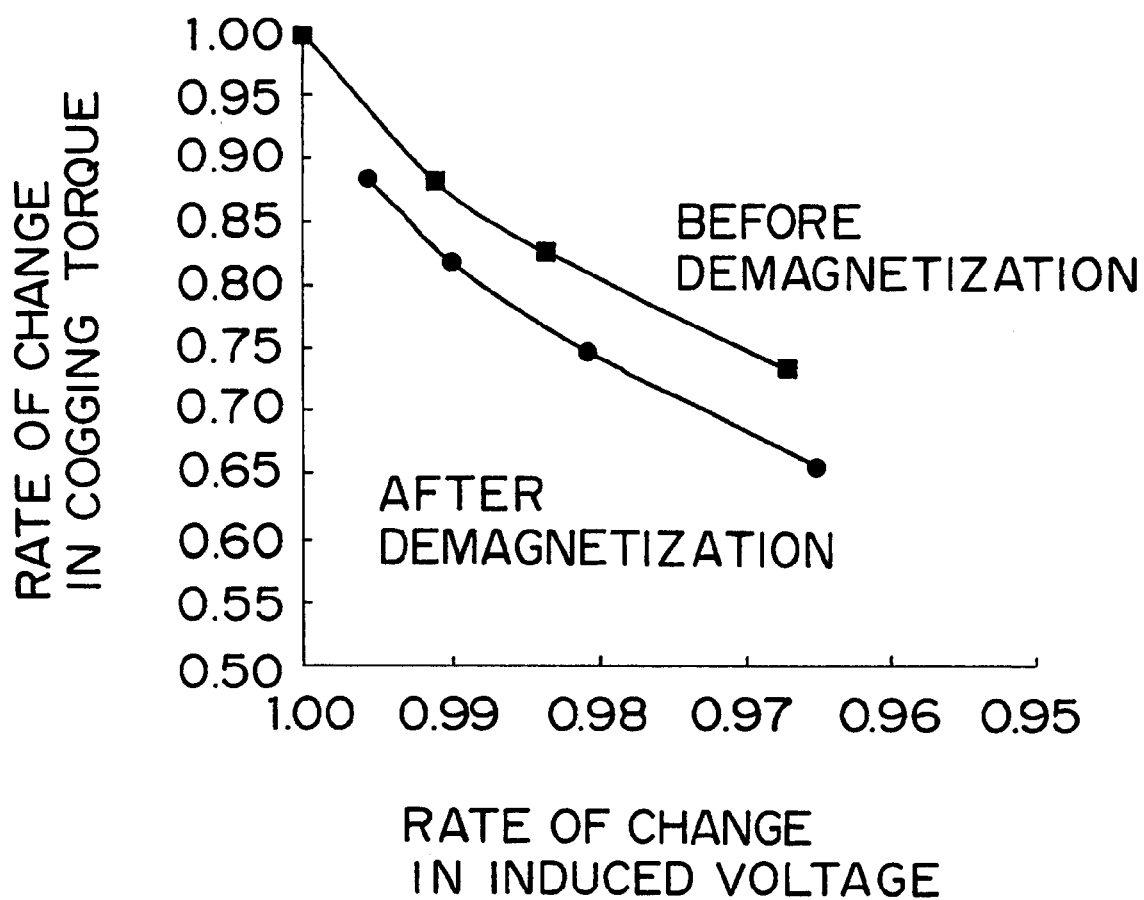
FIG. 8 is a graph showing a reduction in cogging torque caused by the demagnetizing field and thermal demagnetization.

FIG. 8 depicts a change in cogging torque and a change in induced voltage before and after the thermal demagnetization. This graph was prepared on the basis of a cogging torque and an induced voltage at the time when the maximum magnetizing field was applied at a voltage of 2400 V and before the thermal demagnetization. In the permanent magnet field-type compact DC motors used herein, the standard induced voltage V was 0.214 mV/rpm and the standard cogging torque Ct was 0.46 g-cm.

As can be seen from the graph of FIG. 8, when the permanent magnet field-type compact DC motors according to the present invention are thermally demagnetized, a reduction in induced voltage V is smaller than about 0.5%, but the cogging torque can be further reduced about 10%. The reason for this is as follows.

When initial demagnetization is carried out by heating after the arcuate rare earth magnets that are fixed to the soft magnetic frame so as to extend along the inner peripheral surface thereof have been magnetized in the manner of FIG. 5A by making use of a demagnetizing field, the demagnetizing factor at a central portion of a magnetic pole having a large demagnetization curve (both the remanent magnetic flux density Br and the coercive force Hcb are large) becomes small, while the demagnetizing factor at circumferentially opposite end portions of the magnet having a small demagnetization curve becomes large. As a result, the distribution of void magnetic flux densities is rendered to represent a shape closer to a sinusoidal shape, and a larger rate of reduction in cogging torque than the rate of reduction in induced voltage is obtained by demagnetization.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of making a permanent magnet field compact DC motor, the method comprising:

fixing a pair of rare earth magnets composed of rare earth-iron based rapidly quenched and solidified flakes to a soft magnetic frame, so that the pair of rare earth magnets extend along an inner peripheral surface of said soft magnetic frame, and unsaturation-magnetizing the rare earth magnets so that demagnetization curves at circumferentially opposite end portions of the rare earth magnets are made smaller than a demagnetization curve at a central portion of a magnetic pole of each of the rare earth magnets, wherein the soft magnetic frame has portions that do not serve as a back yoke at outer peripheral surfaces of the circumferentially opposite end portions of the rare earth magnets, and the rare earth magnets are unsaturation-magnetized with a soft magnetic material having a round or oval section interposed therebetween.

2. The method according to claim 1, wherein spaces are formed on respective sides of a magnetizing yoke and between the magnetizing yoke and an outer peripheral surface of the soft magnetic frame at locations of the circumferentially opposite end portions of the rare earth magnets.

3. The method according to claim 1, wherein the circumferentially opposite end portions of each of the arcuate rare earth magnets have respective generally flat surfaces forming an angle of 50° to 82° on an outer peripheral surface thereof so that the soft magnetic frame does not serve as a back yoke at the circumferentially opposite end portions of the arcuate rare earth magnets.

4. The method according to claim 1, wherein a strength of an unsaturation-magnetizing field ranges from 15 to 30 kOe.

5. The method according to claim 1, wherein after the pair of rare earth magnets have been unsaturation-magnetized with a soft magnetic material having a round or oval section interposed therebetween, the pair of rare earth magnets are heated so that a demagnetizing factor at the circumferentially opposite end portions is made greater than that at the central portion of the magnetic pole.

6. A method of making a permanent magnet field compact DC motor, the method comprising:

fixing a pair of rare earth magnets composed of rare earth-iron based rapidly quenched and solidified flakes to a soft magnetic frame so that the pair of rare earth magnets extend along an inner peripheral surface of said soft magnetic frame, and unsaturation-magnetizing the rare earth magnets so that demagnetization curves at circumferentially opposite end portions of the rare earth magnets are made smaller than a demagnetization curve at a central portion of a magnetic pole of each of the rare earth magnets, wherein the rare earth-iron-based rapidly quenched and solidified flakes are made of a magnetically isotropic $RE_2TM_{14}B$ (RE: Nd or Pr; TM: Fe or Co) phase smaller than 300 nm and have an intrinsic coercive force of 8 to 10 kOe and a remanent magnetization of 7.4 to 8.6 kG.

7. A method of making a permanent magnet field compact DC motor, the method comprising fixing a pair of rare earth magnets composed of rare earth-iron based rapidly quenched and solidified flakes to a soft magnetic frame so that the pair of rare earth magnets extend along an inner peripheral surface of said soft magnetic frame, and unsaturation-magnetizing the rare earth magnets so that demagnetization curves at circumferentially opposite end portions of the rare earth magnets are made smaller than a demagnetization curve at a central portion of a magnetic pole of each of the rare earth magnets, wherein the rare earth-iron-based rapidly quenched and solidified flakes contain magnetically isotropic ones of a nano-composite structure having a soft magnetic phase and a hard magnetic phase.

8. The method according to claim 7 wherein the soft magnetic phase is made of a Fe, $Fe_3B$, or $Fe_2B$, and the hard magnetic phase is made of $RE_2TM_{14}B$.

9. A method of making a permanent magnet field compact DC motor, the method comprising:

fixing a pair of rare earth magnets composed of rare earth-iron based rapidly quenched and solidified flakes to a soft magnetic frame so that the pair of rare earth magnets extend along an inner peripheral surface of said soft magnetic frame, and unsaturation-magnetizing the rare earth magnets so that demagnetization curves at circumferentially opposite end portions of the rare earth magnets are made smaller than a demagnetization curve at a central portion of a magnetic pole of each of the rare earth magnets, wherein the rare earth magnets are fully dense magnets obtained by hot compression-molding the rare earth-iron-based rapidly quenched and solidified flakes at a temperature higher than a crystallizing temperature and lower than 750° C., the rare earth-iron-based rapidly quenched and solidified flakes containing 13 to 15 atomic percent Nd and/or Pr, 5 to 10 atomic percent B, 0 to 20 atomic percent Co, and a balance of an amorphous phase containing impurities and/or an $RE_2TM_{14}M$ (RE: Nd or Pr; TM: Fe or Co) phase smaller than 300 nm.

10. The method according to claim 9, wherein the fully dense magnets are heated for directly energizing the rare earth-iron-based rapidly quenched and solidified flakes.

11. The method according to claim 9, wherein an outer peripheral surface of the magnetic pole other than the circumferentially opposite end portions of each of the fully dense magnets and a soft magnetic back yoke are integrated by direct energization.

12. The method according to claim 9, wherein the circumferentially opposite end portions of each of the fully dense magnets are urged and fixedly retained against the soft magnetic frame by respective springs.

\* \* \* \* \*

UNITED STATES PATENT AND TRADEMARK OFFICE
CERTIFICATE OF CORRECTION

PATENT NO. : 6,708,388 B1
DATED : March 23, 2004
INVENTOR(S) : Fumitoshi Yamashita et al.

It is certified that error appears in the above-identified patent and that said Letters Patent is hereby corrected as shown below:

Column 16,
Line 5, change "frame," to -- frame --.

Signed and Sealed this

Thirteenth Day of July, 2004

JON W. DUDAS
*Acting Director of the United States Patent and Trademark Office*